United States Patent [19]

Sakai et al.

[11] 4,211,157
[45] Jul. 8, 1980

[54] COFFEE MAKER
[75] Inventors: Koichi Sakai; Kazunori Ikeyama, both of Suita, Japan
[73] Assignee: U.S. Philips Corporation, New York, N.Y.
[21] Appl. No.: 884,373
[22] Filed: Mar. 7, 1978
[30] Foreign Application Priority Data
   Mar. 8, 1977 [JP] Japan .................................. 52-24341
[51] Int. Cl.² ............................................. A47J 27/52
[52] U.S. Cl. ......................................... 99/306; 99/347
[58] Field of Search ................................... 99/306–311, 99/347, 444; 126/381, 382
[56] References Cited
   U.S. PATENT DOCUMENTS
   2,175,332  10/1939  Wertheimer .......................... 126/381
   3,598,105  8/1971  Cristaldi ................................ 126/381
   3,935,804  2/1976  Perez ...................................... 99/306

Primary Examiner—Leonard D. Christian
Attorney, Agent, or Firm—Thomas A. Briody; William J. Streeter; Rolf E. Schneider

[57] ABSTRACT

A coffee maker includes a housing provided with a hinged cover at its top. An arcuate flange adjacent the hinge side of the cover extends downwardly from the inner surface of the cover in the closed position of the cover; and a flange extends radially inwardly and obliquely downwardly from the lower edge of the arcuate flange to form a receptacle. When the cover is moved into its opened position, condensation water on the inner surface of the cover flows into the receptacle. When the cover is returned to its closed position, such condensation water flows into the housing.

1 Claim, 3 Drawing Figures

COFFEE MAKER

This invention relates to a coffee maker comprising a housing, a cover which is situated at the top of the housing, and a filtering device which is situated underneath the cover.

Such coffee makers are generally known.

A problem associated with such apparatus is that during coffee making the steam which is present between the cover and the filtering device condenses on the inner side of the cover. When the cover is removed the condensation drops drip onto the appliance and also onto the heating plate, if any.

It is the object of the present invention to provide a solution to this problem. The coffee maker in accordance with the invention is therefore characterized in that the cover is hingedly connected to the housing and the inner side of the cover is provided with a receptacle for receiving condensation water in the opened position of the cover. Preferably, the receptacle is situated on the hinge side of the cover.

A preferred embodiment of the coffee maker in accordance with the invention is characterized in that the inner side of the cover is provided with an upright rim which in the closed position of the cover is situated near the top edge of the filter holder of the filtering device, the condensation water receptacle being bounded by a cover portion which is situated within the upright rim, by a portion of the upright rim, and by a wall portion which is situated at some distance from the inner side of the cover.

In the closed position of the cover said wall portion preferably extends obliquely downwards in the direction of the receptacle opening. The condensation water, which has collected in the receptacle in the opened position of the cover, can then flow into the filter of the filtering device in the closed position of the cover.

A further embodiment of the coffee maker in accordance with the invention is characterized in that the cover has openings for the passage of steam.

The invention will now be described in connection with the accompanying drawing, in which:

FIG. 1 schematically shows a side view of a coffee maker in accordance with the invention.

Figure 1:
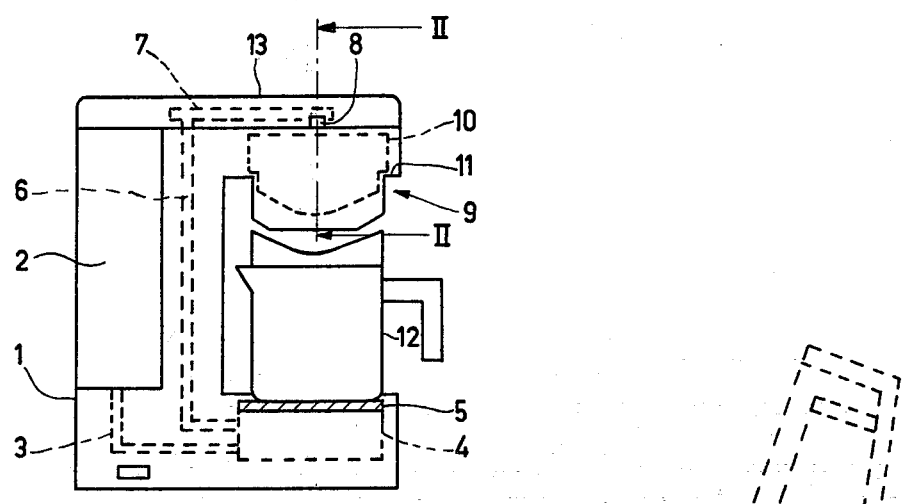

In FIG. 1 the reference numeral 1 designates the housing of the coffee maker. The housing accommodates a water reservoir 2, a discharge conduit 3, a flow heater 4 with heating plate 5, a riser pipe 6, and outlet pipe 7, which is rotatably connected to the riser pipe, with an outlet opening 8. The housing furthermore accommodates a filtering device 9. The removable filter holder 10 of the filtering device is supported by a rim 11 of the housing. Underneath the filtering device a coffee pot 12 can be placed on the heating plate 5 for receiving the filtered coffee brew.

Figure 2:
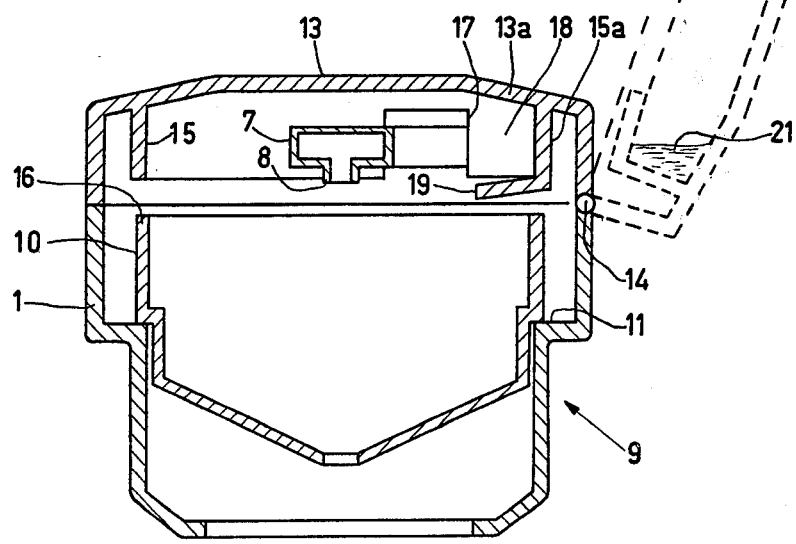
FIG. 2 is a partial cross-section on an enlarged scale of the coffee-maker taken on the line II—II in FIG. 1, showing the cover with the condensation-water receptacle and the filtering device.
Figure 3:
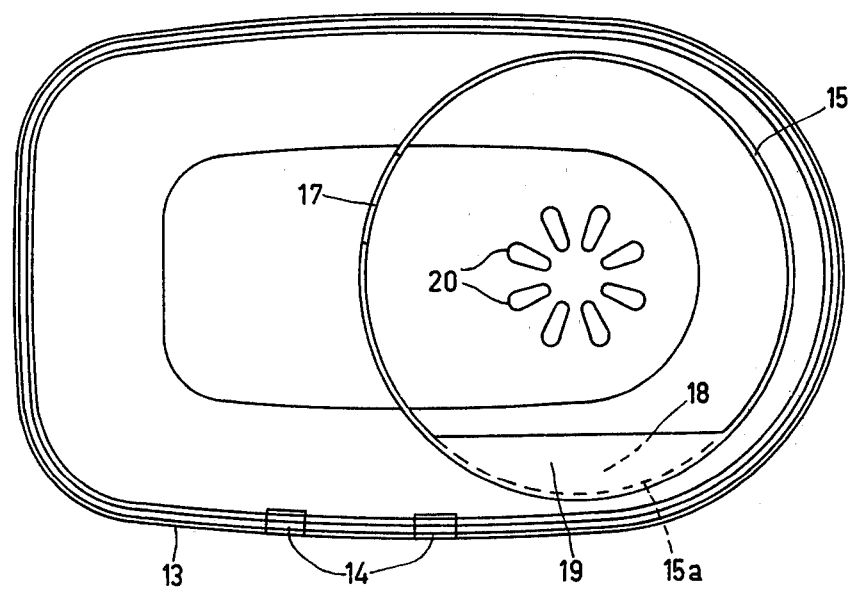
FIG. 3 is a plan view which shows the interior of the cover of FIG. 2.

At the top of the housing there is located a cover 13. As is shown in FIG. 2, the cover 13 is hingedly connected to the housing with the aid of hinges 14. The inside of the cover has an upright rim 15, which is situated near the top edge 16 of the filter holder 10 in the closed position of the cover. The upright rim 15 has a recess 17 with which the outlet pipe 7 engages in the closed position of the cover (also see FIG. 3). On the side of the hinge 14 the cover has a small receptacle 18 for condensation water. This receptacle is bounded by a portion 13a of the cover, by a portion 15a of the upright rim 15, and by a wall portion 19 which is situated at some distance from the inside of the cover. Preferably, this wall portion is extended somewhat obliquely downwards in the closed position of the cover. FIG. 3 shows that wall portion 19 has the shape of a circular segment. Moreover, openings 20 are formed in the cover.

During coffee making steam is formed between the cover and the filtering device. Part of the steam will escape through the openings 20. The remainder will condense on the inside of the cover in the form of condensation drops. For subsequent use of the coffee maker the cover 13 should be tilted up in order to enable the filter holder 10 to be removed. The condensation drops then collect in the receptacle as condensed water 21. After the filter holder, provided with a fresh filter with ground coffee, has been replaced in the apparatus and the water reservoir 2 has been refilled the cover is again swung onto the housing. The condensed water 21 then flows into the filter. Although the condensation water is then cold, this will hardly effect the flavour of the coffee, because the amount of condensed water is small.

It is alternatively possible to provide the cover 13 with a condensation water receptacle which in the closed position of the cover is situated at the location of the water reservoir 2 instead of near the filtering device. Obviously, the cover hinge should then be situated near the water reservoir 2. When the cover is lowered onto the housing, the condensed water flows out of the small receptacle into the water reservoir 2. Obviously, the cover should then be provided with a different rim 15.

What is claimed is:

1. A coffee maker including a housing having an open top; a cover normally closing the top of the housing and hingedly connected to the housing; a filter holder for ground coffee arranged in the housing underneath the cover; an arcuate flange extending downwardly from the inner surface of the cover in its closed position, said arcuate flange being situated adjacent the hinged side of the cover and above the top edge of the filter holder; and a flange extending radially inwardly and obliquely downwardly from the lower edge of the arcuate flange to form a receptacle; condensation water on the inner surface of the cover flowing into the receptacle when the cover is moved into its opened position, said condensation water flowing into the filter holder when the cover is returned to its closed position.

* * * * *